United States Patent
Liang et al.

(10) Patent No.: US 10,058,983 B2
(45) Date of Patent: Aug. 28, 2018

(54) TORQUE SENSING DEVICE AND THE ROTATIONAL DRIVING TOOL COMBINED THEREOF

(71) Applicant: PRODRIVES & MOTIONS CO., LTD., Taipei (TW)

(72) Inventors: Chia-Sheng Liang, Taipei (TW);
Yuen-Yang Hu, Taipei (TW);
Meng-Jen Chiu, Taipei (TW);
Chu-Hsiang Tseng, Taipei (TW)

(73) Assignee: PRODRIVES & MOTIONS CO., LTD., Taipei (TW)

( * ) Notice: Subject to any disclaimer, the term of this patent is extended or adjusted under 35 U.S.C. 154(b) by 298 days.

(21) Appl. No.: 14/991,896

(22) Filed: Jan. 8, 2016

(65) Prior Publication Data
US 2017/0097269 A1    Apr. 6, 2017

(30) Foreign Application Priority Data

Oct. 6, 2015 (TW) ............................ 104132814 A

(51) Int. Cl.
| B25B 21/00 | (2006.01) |
| B25B 23/142 | (2006.01) |
| G01L 3/14 | (2006.01) |
| F16H 57/08 | (2006.01) |
| F16H 1/02 | (2006.01) |

(52) U.S. Cl.
CPC .......... *B25B 21/00* (2013.01); *B25B 23/1425* (2013.01); *G01L 3/1471* (2013.01); *F16H 1/02* (2013.01); *F16H 57/082* (2013.01)

(58) Field of Classification Search
USPC ...................................................... 73/862.338
See application file for complete search history.

(56) References Cited

U.S. PATENT DOCUMENTS

| 5,172,774 A | 12/1992 | Melrose |
| 8,302,702 B2 | 11/2012 | Hansson et al. |
| 9,702,774 B1 * | 7/2017 | Sun .......................... G01L 3/105 |
| 2010/0139432 A1 | 6/2010 | Steckel et al. |
| 2015/0135856 A1 | 5/2015 | Kim et al. |
| 2017/0184466 A1 * | 6/2017 | Liang ........................ F16H 1/28 |

FOREIGN PATENT DOCUMENTS

JP        2017116524 A  *  6/2017  ............... F16H 1/28

* cited by examiner

*Primary Examiner* — Lisa Caputo
*Assistant Examiner* — Jamel Williams
(74) *Attorney, Agent, or Firm* — Chun-Ming Shih

(57) ABSTRACT

A torque sensing device includes an idle wheel disposed between a force input shaft and a force output shaft, the idle wheel receives a tangential force from the force input shaft and the force output shaft to generate a counterforce as a loading, the center of the idle wheel is pivotally disposed on a positioning beam or a basis nearby, the positioning beam has a beam central line where a strain gauge installed. The positioning beam transforms the loading of the idle wheel along the beam central line to a normal force on the cross section of the positioning beam along the beam central line, the positioning beam generates a strain due to the normal force on the cross section of the positioning beam, the strain gauge detects the strain as the torsion sensing value of the output shaft on the region between the force input shaft and the force output shaft. A rotational driving tool is combined with the torque sensing device to improve the detecting precision of the torsion.

26 Claims, 12 Drawing Sheets

(A-A)

TORQUE SENSING DEVICE AND THE ROTATIONAL DRIVING TOOL COMBINED THEREOF

BACKGROUND

1. Technical Field

The technical field relates to a torque sensing device which detects the strain to obtain the torsion value, and a rotational driving tool integrated with the torque sensing device.

2. Related Art

The traditional rotational driving mechanisms all generate torsion. However, during the process of transferring the torsion, it becomes a problem for how to precisely detect the variation of the torsion value.

The U.S. Pat. Nos. 5,172,774 and 8,302,702, and US Patent Publication Nos. 20100139432 and 20150135856 all disclose using a strain gauge as a sensor to detect the variation of the torsion value which is generated by the torsion driving device.

The conventional strain gauge consists of an insulating flexible backing which supports a metallic foil pattern. The pattern is a long, thin conductive strip in a zig-zag pattern of parallel lines. When in use, the strain gauge can be fixed to a metal carrier material which can deform with the strain gauge when receiving load. When the strain gauge deforms with the carrier material under deformation process, the strain of the carrier material can be observed through the variation of the resistance value.

Those patents mentioned above teach using mechanical component as a carrier material to work with strain gauge, and the applied force of the torsion can be absorbed by the carrier material, so as to generate strain to force the strain gauge to deform along with the carrier material, and thus the variation of the torsion in the driving mechanism can be obtained.

However, the position that the strain gauge is installed on the carrier material in the aforementioned patents cannot ideally detect the strain transformed from the torsion. For example, the US Patent Publication No. 5172774 teaches directly installing a plurality of strain gauges on a plurality of shear webs formed by a gear being able to transfer torsion, and the shear webs are used as the carrier material. Even though the shear webs can transfer the loading along the web surface to generate strain, the detected strain not only includes the normal direction strain, but also includes a shear strain, which results in that the strain generated by the shear web cannot fully represent the torsion variation of the gear, and thus the accuracy and precision of the torsion detection cannot be achieved.

Besides, the US Patent Publication No. 20100139432 discloses a transducer fixed to the casing for pivotally connecting to the torque shaft, the transducer is formed as a round plate shape and has a hub for pivotally connecting to the torque shaft. The surrounding of the hub extends to form a disk-shaped web having a ring, and the web is used as the aforementioned carrier material to be installed at least one strain gauge to the variation of the torque shaft. However, the web is formed in disk-shaped ring, which is hard to transfer the applied force transformed from the torsion in a converged way. In other words, the strain generated from the web due to the torsion transfer will be dispersed to the whole area of the ring-shaped web, which can significantly reduce the deformation of the strain gauge, so as to relatively decrease the accuracy and precision of the torsion detection.

Besides, the US Patent Publication No. 8302702 discloses installing the strain gauge to surfaces of side edges of a frame-shaped torque transferring element, and the center of the frame-shaped torque transferring element is connected to an annular gear to use the strain gauge to detect the torsion of the annular gear. However, the side edges of the frame-shaped torque transferring element and the center of the annular gear transfer the action force through the ring-shaped element around the torque transferring element, which force the position where the strain gauge installed suffering bending torque, and thus the precision and accuracy of the torsion detection cannot be achieved.

The US Patent Publication No. 20150135856 discloses a wheel base type force torque sensor for detecting the force or torsion generated when the system meets an obstacle, which is usually used for safety purpose. The center of the force torque sensor also forms a hub coaxially connecting to the rotation element, and the periphery of the force torque sensor is also formed a rim structure. A plurality of beams is formed between the periphery of the hub and the rim, and the end surface of the periphery of the beams can respectively be installed with a strain gauge. The beams are used to transform the received loading to the bending loading to the beam to generate tensile force/compressing force/shear force, so as to allow the strain gauge installed on the beam to detect the strain generated from the beam, and the variation of the torsion value can be observed. However, the aforementioned Patent does not further disclose how the beams transform the received loading to the tensile force/compressing force/shear force, so that the end surface of the periphery of the beams should be installed with strain gauge to increase the accuracy of the detection, which may cause using too many strain gauges and increasing the complexity of the strain structure.

Also, it can be known from the aforementioned techniques that, the traditional torque sensor equipped with strain gauge does not design the position of the beams relative to the torsion center according to the deformation direction of the strain gauge even though the traditional torque sensor uses the tensile strain/compressing strain generated by the beams under loading to force the strain gauge to generate corresponding deformation.

BRIEF SUMMARY

The purpose of a preferred embodiment of the present invention is to improve the configuration and position of the strain gauge installed in the traditional torque sensing device to fully transform the torsion into tensile strain or compressing strain for applying to the strain gauge, thereby avoiding the torsion to be transformed to a resultant force or component force which may cause unwanted bend to the strain gauge, so as to improve the torsion detecting precision of the strain gauge.

In order to achieve the goal and solve the problem mentioned above, one of the preferred embodiment of the present invention provides a torque sensing device, which includes: an idle wheel disposed between an force input shaft and an force output shaft, the idle wheel receiving a tangential force from the force input shaft and the force output shaft respectively, and a sum of the tangential forces being formed a counteraction force as a loading of the idle wheel; a linear shaped positioning beam having a beam central line extending along the positioning beam, a center of the idle wheel being pivotally disposed on the positioning beam where the beam central line penetrates through; a strain gauge fixed to the positioning beam where the beam central line penetrates through, the center of the idle wheel being separated from a center of the strain gauge by the beam central line; wherein the positioning beam transforms the loading of the idle wheel to an axial force along the beam central line, the positioning beam generates a strain by the axial force, the strain gauge detects the strain as a torque sensing value of the force output shaft on the region between the force input shaft and the force output shaft.

In addition, the aforementioned technique further includes: the idle wheel, the force input shaft, and the force output shaft are non-coaxial disposed. Wherein, directions of the tangential forces are the same, and directions of the tangential forces and the counteraction force are opposite; the counteraction force is the axial force. Wherein, a direction of the beam central line of the positioning beam is parallel to the directions of the tangential forces, and a center of the force input shaft, a center of the force output shaft, and the center of the idle wheel are all aligned to be perpendicular to the beam central line. Wherein, a force input gear coaxially fixed to the force input shaft, and a force output gear coaxially fixed to the force output shaft; the idle wheel is an idle gear; the idle gear engages to the force input gear and the force output gear to bear the loading. Wherein, the torque sensing device further comprises a casing used as a basis and accommodating the torque sensing device; the positioning beam and the casing are fixed as an integral unit. Wherein, the center of the idle wheel is pivotally installed on the beam central line of the center of the positioning beam. Wherein, the idle wheel separates the positioning beam into a first positioning beam and a second positioning beam which are respectively disposed on both sides of the idle wheel on the beam central line; the strain gauge is disposed on the beam central line of at least one of the first positioning beam and the second positioning beam, the axial force is the normal tensile force applied to the strain gauge on the cross section of the first positioning beam to cause a tensile strain; and is the normal compressed force applied to the strain gauge on the cross section of the second positioning beam to cause compressing strain.

Besides, the force input shaft and the force output shaft can also be coaxially disposed and spaced apart from each other. Wherein directions of the tangential forces are the same, and directions of the tangential forces and the counteraction force are opposite; wherein a direction of the beam central line of the positioning beam is parallel to the directions of the tangential forces, and a center of the force input shaft, a center of the force output shaft, and the center of the idle wheel are all aligned to be perpendicular to the beam central line.

Wherein, the force input shaft is coaxially fixed to a sun gear, the force output shaft is formed by an annular gear encircling the sun gear, a quantity of the idle wheel is at least two and the two idle wheels are planetary gears respectively disposed between the sun gear and the annular gear, the planetary gear engages between the sun gear receiving inputting force and the annular gear receiving outputting force to bear a torsion, the two planetary gears are restricted by the positioning beam and do not rotate around the sun gear freely. Wherein an amount of the positioning beam is plural, and the positioning beams are spaced part by the planetary gears and symmetrically disposed on a wheel base used as a basis.

Wherein, the center of the planetary gears are respectively and pivotally disposed on the beam central line of the center of the positioning beam. Wherein, the positioning beams are separated by the planetary gears to dispose on a co-beam central line at both sides of the planetary gears as a first positioning beam and a second positioning beam, the strain gauge is disposed on the beam central line of at least one of the positioning beams, the axial force is the normal tensile force applied to the cross section of the first positioning beam to cause a tensile strain, and is the normal compressing force applied on the cross section of the second positioning beam to cause compressing strain, the strain gauge detects the strain value of at least one of the tensile strain and the compressing strain. Wherein, the center of the planetary gear used as an idle wheel can be pivotally disposed on the beam center line of the positioning beam, and even on the positioning beam.

Wherein a hub is formed at a center of the wheel base, and the sun gear is disposed through the center of the hub. Besides, the torque sensing device further comprises a casing for accommodating the torque sensing device; the wheel base and the casing are fixed as a integral unit.

Another preferred embodiment of the present invention further provides a torque sensing device, and the difference compared to the aforementioned embodiment lies in that: the center of the idle wheel does not pivotally dispose on the positioning beam but pivotally dispose on a wheel base which is integrally formed with the positioning beam and used as a basis. By this arrangement, the loading of the idle wheel is transferred to the positioning beam through the wheel base, and the loading is transformed to the axial force along the beam central line by the positioning beam. Therefore, the positioning beam can generate strain to enable the strain gauge to detect the torsion value. Besides, the planetary gears are restricted by the wheel base instead of the positioning beam, and thus the planetary gears do not rotate around the sun gear.

Another preferred embodiment of the present invention further provides a rotational driving tool combined with the torque sensing device, the rotational driving tool includes: a driving shaft connected to a driving motor to provide driving torque, and the driving shaft is coaxially connected to the force input shaft; and a working shaft coaxially connected to the force output shaft. Wherein the rotational driving tool is a screw driver, and the driving motor is an electric motor or a pneumatic motor.

According to the aforementioned technique, the technique lies in that: the idle gear bears the tangential force of the force input shaft and the force output shaft, and the idle wheel fully transforms the loading into a tensile or compressing axial force which is then applied to the positioning beam, thereby keeping every unit area of the positioning beam fixed with strain gauge bearing same tensile or compressing strain, and thus forming even strain within a specific length range of the positioning beam. The strain gauge forms even deformation accordingly, which prevent the positioning beam from bearing not necessary bending torque, so as to improve the precision of the torsion detection of the strain gauge.

Besides, in the preferred embodiment that the center of the aforementioned idle wheel pivotally disposed on the positioning beam, the beam central line of the positioning beam is parallel or non-parallel to the tangential force direction which the force input shaft and the force output shaft apply to the idle wheel, and the center of the force input shaft, the idle wheel, and the force output shaft all align in a straight line. The straight line and the beam central line form a right angle, which can further make sure that there will be no other component force generated when the positioning beam transfers the axial force along the beam central line, and thus preventing the positioning beam from bearing not necessary bending torque, so as to improve the precision of the torsion detection of the strain gauge.

On the other hand, in the preferred embodiment that the center of the aforementioned idle wheel pivotally disposed on the wheel base, the beam central line is non-parallel to the tangential force direction, which allows the loading of the idle wheel can be transferred to the positioning beam through the stress transmission effect of the wheel base, which can further make sure that there will be no other component force generated when the positioning beam transfers the axial force along the beam central line, and thus preventing the positioning beam from bearing not necessary bending torque, so as to improve the precision of the torsion detection of the strain gauge.

The detail of the embodiment of the aforementioned device, technique, and the effect caused therefrom will be illustrated as follows.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
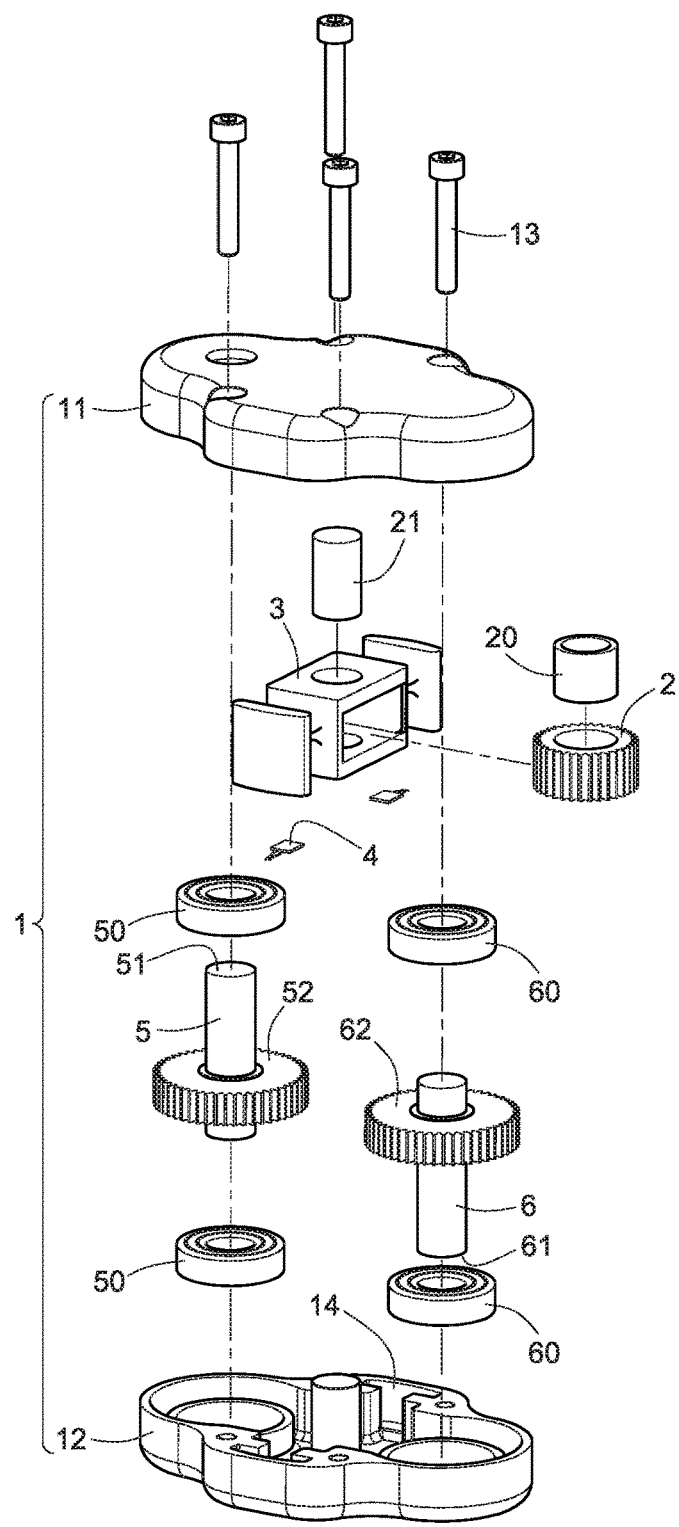
FIG. 1 is an exploded perspective view of a first preferred embodiment of the torque sensing device according to the present invention.

Referring to FIGS. 1 to 4, which disclose the first preferred embodiment of the present invention. The torque sensing device includes an idle wheel 2, a positioning beam 3, a strain gauge 4, a force input shaft 5 and a force output shaft 6. More specifically, a casing 1 is used to assemble the idle wheel 2, the positioning beam 3, the strain gauge 4, the force input shaft 5 and the force output shaft 6.

As shown in FIG. 1, the casing 1 can be consisted of an upper casing 11 and a lower casing 12 which are screwed together by screw 13. The casing 1 is substantially the basis of the whole device and can be used to pivotally connect the force input shaft 5 and the force output shaft 6. More specifically, the force input shaft 5 and the force output shaft 6 can respectively and pivotally installed in the casing 1 through the bearing 50/60, and a terminal 51/61 of the force input shaft 5 and the force output shaft 6 can respectively protrude outside of the casing 1.

Figure 2A:
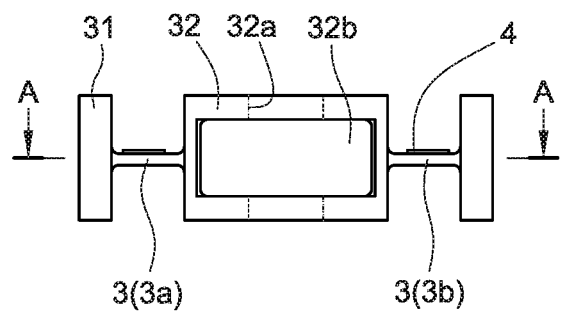
FIGS. 2a and 2b are a front side view and an A-A sectional view of the positioning beam in FIG. 1 according to the present invention.
Figure 2B:
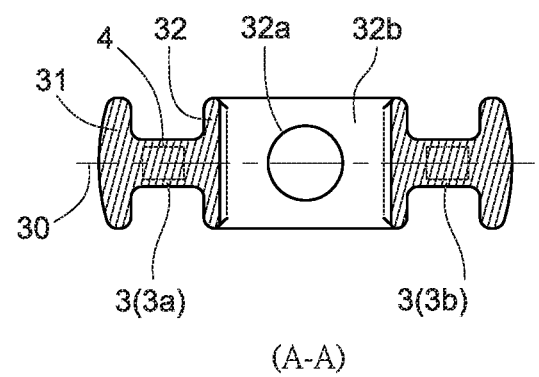

As shown in FIGS. 2a and 2b, which show the embodiment of the positioning beam 3 in FIG. 1. The positioning beam 3 can be made of a metal, such as carbon steel, to form a homogeneous and straight linear form body, and each sections of the beam can show the same cross section. The positioning beam 3 disposes at the center of the torque sensing device and has a linear beam central line 30. The beam central line 30 extends along with the positioning beam 3 to penetrate the positioning beam 3 and evenly divide both ends and both sides of the positioning beam 3. The beam has the features of metal strength sustainable for tensile and compressed forces. The beam can also evenly transfer the action force to cause even deformation in the allowable range of the metal material, and thus can be used as the carrier of the strain gauge 4.

Both ends of the linear positioning beam 3 are respectively and integrally formed a hook part 31 and a base part 32. The hook part 31 can be formed as T-shaped body. The base part 32 can be a rectangle and frame-shaped body. The beam central line 30 extends to the center of the base part 32 and the hook part 31. The base part 32 is provided with a pivoting hole 32a on the beam central line 30, and the center of the base part 32 is formed with an accommodation space 32b for accommodating the idle wheel 2.

Figure 3:
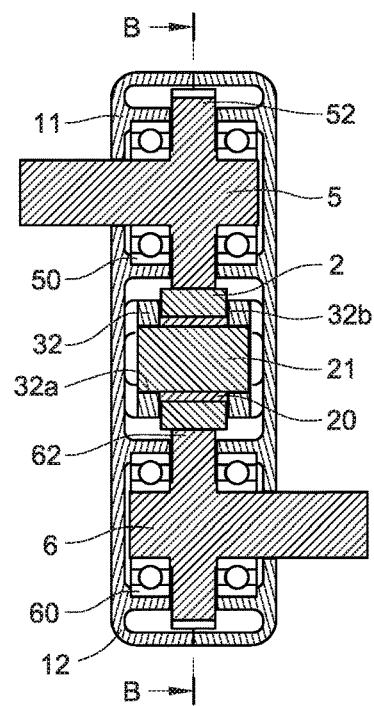
FIG. 3 is a lateral sectional view of FIG. 1 after being assembled.
Figure 4:
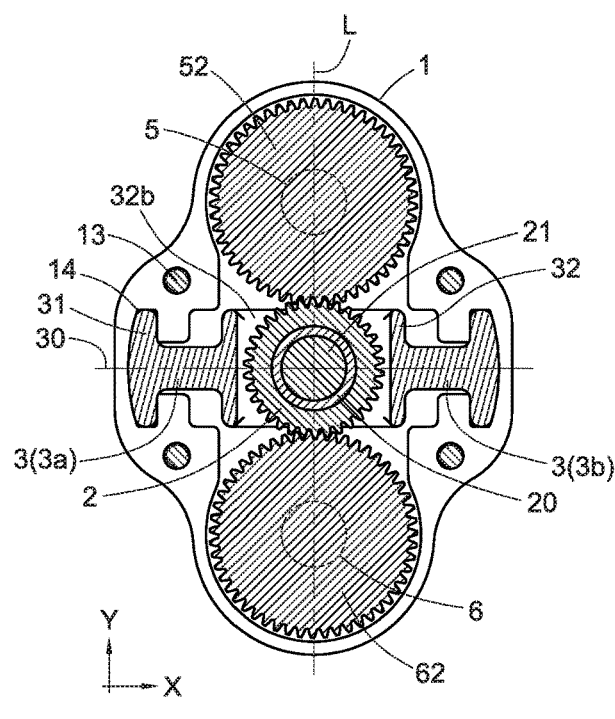
FIG. 4 is a B-B sectional view of FIG. 3.

As shown in FIGS. 3 and 4, the idle wheel 2 as shown in FIG. 1 can be assembled with the bearing 20 and the idle gear shaft through the pivoting hole 32a of the base part 32 to further be pivotally installed in the accommodation space 32b of the base part 32. Wherein, the bearing 20 and the idle gear shaft 21 are disposed inside the idle wheel 2. By this arrangement, the center of the idle wheel 2 is pivotally disposed at one end of the positioning beam 3 where the beam central line 30 penetrates through. The idle wheel 2 separates the positioning beam 3 and the comparing hook part 31 as well.

Referring to the embodiment as shown in FIGS. 1 to 4, the positioning beam 3 can be formed at both ends of the base part 32 and includes a first positioning beam 3a and a second positioning beam 3b. The hook part 31 is respectively formed at the outer end of the first positioning beam 3a and the second positioning beam 3b. By this arrangement, the base part 32 and the idle wheel 2 inside the base part 32 are disposed between the first positioning beam 3a and the second positioning beam 3b, and the center of the first positioning beam 3a, the second positioning beam 3b, and the idle wheel 2 are all penetrated by the same beam central line 30.

Since the positioning beam 3 needs to be fixed inside the casing 1, embedding slots 14 can be formed inside the casing 1. The hook parts 31 at both ends of the positioning beam 3 can be embedded into the embedding slots 14 respectively to fix the positioning beam 3 in the casing 1. Wherein, the shape of the embedding slot 14 can form as T-shape corresponding to the hook part 31, or other shapes that can be match with the hook part 31. Besides, the positioning beam 3 can be screwed, integrally formed, or other equivalent method to the casing 1.

Figure 5:
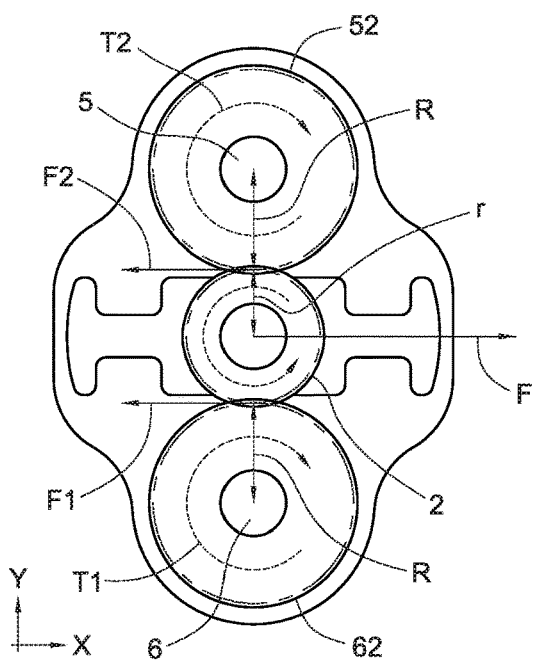
FIG. 5 is an illustration of the forward force applied to the positioning beam and generated in FIG. 4 according to the present invention.

Referring to FIG. 5, the idle wheel 2 needs to be installed between the force input shaft 5 and the force output shaft 6. The idle wheel 2 bears the tangential force F1/F2 respectively formed by the force input shaft 5 and the force output shaft 6 (as shown in FIG. 5) to further generate a counterforce F as the loading of the idle wheel 2.

More specifically, when the force output shaft 6 receives the resistance caused by the outer power requirement end connected thereto, the resistance transfers through the idle wheel 2 to make the force input shaft 5 generate driving torsion (as shown in FIG. 5); in order to be easy to apply, and also prevent the driving torsion from losing when transferring from the force input shaft 5 to the force output shaft 6, the idle wheel 2, the force input shaft 5 and the force output shaft 6 are non-coaxial disposed. More specifically, the center of the force input shaft 5, the idle wheel 2, and the force output shaft 6 are all disposed on a straight line L; the line L is parallel to the Y axis in the FIG., and line L forms a right angle with the beam central line 30. Besides, a force input gear 52 is coaxially fixed to the force input shaft 5, and a force output gear 62 is coaxially fixed to the force output shaft 6; the idle wheel 2 can be an idle gear which engages to the force input gear 52 and the force output gear 62 to bear and transfer the driving torsion. It is noted that, the so called "pivotally connect" means the gear and the shaft are integrally formed, or fixed by a bolt or a pin, to make the gear and the shaft coaxially fixed together. The force input gear 52, the idle gear 2, and the force output gear 62 engage with one another on the line L. Besides, the force input gear 52, the idle gear 2, and the force output gear 62 are all accommodated inside the casing 1.

Referring to FIG. 5, when the force input gear 52 rotates clockwise, the idle gear 2 will be brought to rotate counter-clockwise. The idle gear 2 drives the force output gear 62 to rotate clockwise to output the power. Wherein, assumed that the pitch radiuses of the force input gear 52 and the force output gear 62 are the same (no reduction ratio), when the force input gear 52 rotates or is in stationary state, a driving torsion (T2=R× F2) can be generated from the center thereof. Wherein, the F2 is the tangential force generated along the X axis when the force input gear 52 drives the idle gear 2 to rotate or stop; when the force output gear 62 rotates or is in stationary state, a driving torsion (T1=R×F1) can be generated from the center thereof. Wherein, the F1 is the tangential force generated along the X axis when the idle gear 2 drives the force output shaft 62 to rotate or stop. The directions of the tangential force F1 and F2 are the same and parallel to each other, and the direction of the beam central line 30 and the tangential force F1 and F2 are parallel to one another.

The force output gear 62 has to overcome the loading torsion T1 when outputting power. Thus, the driving torsion T2 of the force output gear 62 needs to overcome the loading torsion T1 to reach a balance. One skilled in the art can realize F=F1+F2 according to the known force balance theorem ΣFx=0, wherein the fixed positioning beam 3 restricts the idle gear 2 to be only able to do in situ rotation, and the F in the equation above becomes the loading of the idle wheel 2, which is also the counterforce generated from the center of the idle gear 2 along the beam central line 30. The counterforce F (axial force hereinafter) is applied to the cross section of the positioning beam 3 in a way of normal force, in other words, the positioning beam 3 forms strain under the axial force F (Detailed afterward).

In the embodiment that the positioning beam 3 is distinguished as the first positioning beam 3a and the second positioning beam 3b, since the two hook parts 31 are embedded into the casing 1, the axial force F along the X axis will be applied to the cross section of the first positioning beam 3a to form compressing strain in a way of normal compressing force $F_{compress}$, the axial force F will be applied to the cross section of the second positioning beam 3b to form tensile strain in a way of normal tensile force $F_{tensile}$.

Figure 6A:
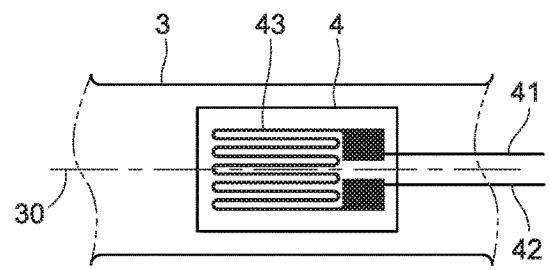
FIGS. 6a and 6b are the partially enlarged view and the sectional schematic view of the positioning beam in FIG. 2b.

Referring to FIGS. 2a and 2b, the strain gauge 4 needs to be fixed to the positioning beam 3 where the beam central line 30 penetrates through. Basically, under the condition that any one of the cross section areas where the strain gauge 4 fixed to the positioning beam 3 is the same, the strains formed in each point of any one of the cross sectional area should be the same. Therefore, the strain gauge 4 can detect the tensile strain/compressing strain as long as being fixed to the positioning beam 3 and parallel to the beam central line 30. In other words, even though the fixing position on the beam central line 30 of the positioning beam 3 for being fixed the strain gauge 4 slightly deviate upwardly or downwardly, the precision of the strain detection will not be influenced. In the embodiment that the positioning beam 3 is distinguished as the first positioning beam 3a and the second positioning beam 3b, the strain gauge 4 should be fixed to the beam central line which penetrates the first positioning beam 3a and the second positioning beam 3b, and thus the center of the idle wheel 2 and the strain gauge 4 are spaced apart from each other by the beam central line 30. The limitation "fix" includes gluing or embedding to make the strain gauge 4 tightly connect to the first positioning beam 3a and the second positioning beam 3b respectively. Besides, as shown in FIG. 6a, the center of the strain gauge 4 is separated by the beam central line 30, which means the strain gauge 4 has two connecting terminals 41/42 approximately parallel to each other. Between the two connecting terminals is a pattern of a plurality of zig-zag sensing part 43. When in assembling, the two connecting terminals 41/42 are respectively separated at both sides of the beam central line 30, and the two connecting terminals 41/42 are used for connecting electric bridge circuit (detailed afterward). By this arrangement, the normal tensile force $F_{tensile}$ on the cross section of the first positioning beam can pull the strain gauge 4 on the first positioning beam 3a to form tensile strain, and the normal compressing $F_{compress}$ on the cross section of the second positioning beam can compress the strain gauge 4 on the second positioning beam 3b to form compressing strain.

Figure 6B:
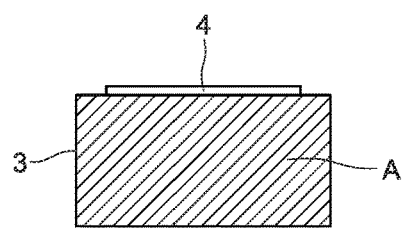

Referring to FIGS. 6a and 6b, in order to make the strain gauge 4 more sensitive when detecting the strain ε formed by the positioning beam 3, the strain gauge 4 can be fixed to the position with smallest cross sectional area A of the positioning beam 3 if different sections of the positioning beam 3 have different cross sectional area due to the variation of the curvature or the contour of the positioning beam 3. The so called smallest cross sectional area A must has a suitable length on the positioning beam 3 for being able to attach or fix the strain gauge 4, and make sure any one of the smallest cross sectional areas A within the suitable length range is the same, so as to the loading borne by the idle wheel 2 can be swiftly transferred to the smallest cross sectional area A of the positioning beam 3 where the strain gauge 4 is fixed through the base part 32 to form strain. However, the present invention is not limited thereto, as long as the strain gauge 4 is fixed to the positioning beam where the beam central line passes through. Besides, the stress a of each point P in the cross sectional area A of the positioning beam 3 where the strain gauge 4 is fixed should be within the fatigue strength of the metal material selected for being used as the positioning beam 3. The aforementioned stress σ and strain ε are shown as the equations (1) and (2) below:

$$\sigma = \frac{F}{A} < \frac{1}{2} \times S_{ult} = E\varepsilon \qquad \text{equation (1)}$$

$$\varepsilon = \frac{\delta}{L} \qquad \text{equation (2)}$$

Wherein the $S_{ult}$ is the ultimate tensile strength of the metal material, E is the Young's modulus of the metal material of the positioning beam, ε is the strain, δ is the elongation or the shortening of the first positioning beam or the second positioning beam after receiving the axial force F; L is the length of the first positioning beam or the second positioning beam before receiving the axial force F.

The preferred embodiment of the present invention further simulates the structural safety by the following data when the positioning beam 3 forms strain deformation, which includes: setting the torsion T1=16 N-m received by the force output gear 62. According to the force balance, it can be known that the driving torsion T1=T2=16 N-m; the pitch radius of the force output gear 62 and the force input gear 52 is R=15.3 mm; the pitch radius of the idle gear 2 is r=5.1 mm. Based on those parameters above, it can be shown as follows:

F1=F2=T1/R=16/(15.3/1000)=1045.75 N=106.6 Kgf

F=F1+F2=106.6+106.6=213.2 Kgf

Setting up the metal material of the positioning beam 3 as A6061-T6, and the yield strength thereof is 28 kgf/mm², tensile strength $S_{ult}$ is 32 kgf/mm², and the Young's modulus E=7000 kgf/mm². Besides, the cross sectional area A for fixing the strain gauge 4 on the positioning beam 3 is A=5.6×1.2=6.72 mm², and the length of the positioning beam 3 (one of the first positioning beam 3a and the second positioning beam 3b) is set as L=9 mm. According to equation (1), the stress σ in the position where the strain gauge 4 is fixed to the positioning beam 3 is:

$F_{compress}=F_{tensile}$=0.5*F=106.6Kg

σ=$F_{compress}$/A=$F_{tensile}$/A=106.6Kgf/6.72 mm²=15.9Kgf/mm²

It can be known that the strain σ is smaller than half of the tensile strength $S_{ult}$=32 kgf/mm², and thus the positioning beam 3 is qualified as having enough fatigue life.

Besides, according to the equation (1), it can be known that the strain ε=σ/E=15.9/7000=0.0023 generated at the position where the strain gauge 4 is fixed to the positioning beam 3. According to equation (2), ε=δ/L, the elongation or shortening of the positioning beam δ=ε×L=0.0023×9=0.02 mm. Thus, for the ultimate tensile strength $S_{ult}$ (32 kgf/mm²) and the yield strength (28 kgf/mm²) of the metal material A6061-T6 used in the positioning beam 3, the stress a (15.9 Kgf/mm²) on the carrier material is acceptable, and thus the structure of the positioning beam 3 (including the first positioning beam 3a and the second positioning beam 3b) is safe.

Since the base part 32 and the hook part 31 of both ends of the positioning beam 3 use the same metal material to be extendedly and integrally formed (including the first positioning beam 3a and the second positioning beam 3b, the same below), when the structure of the positioning beam 3 is safe, the stress σ and the strain ε generated during the process of transferring the axial force F (which means one of the normal compressing force $F_{press}$ and the normal tensile force $F_{strain}$ on the cross section of the positioning beam) by the base part 32 and the hook part 31 should be within the safety range.

Figure 7A:
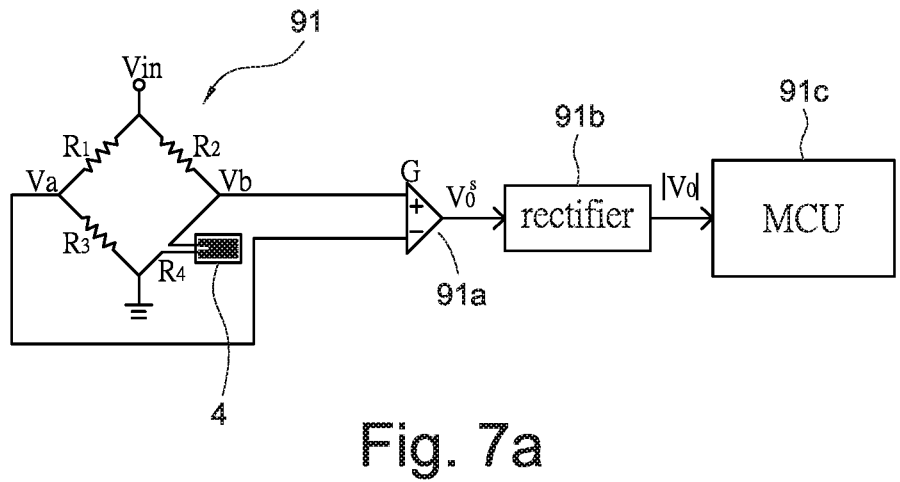
FIGS. 7a and 7b are the schematic diagrams of the circuit configuration with different quantities of the strain gauge as shown in FIG. 1.
Figure 7B:
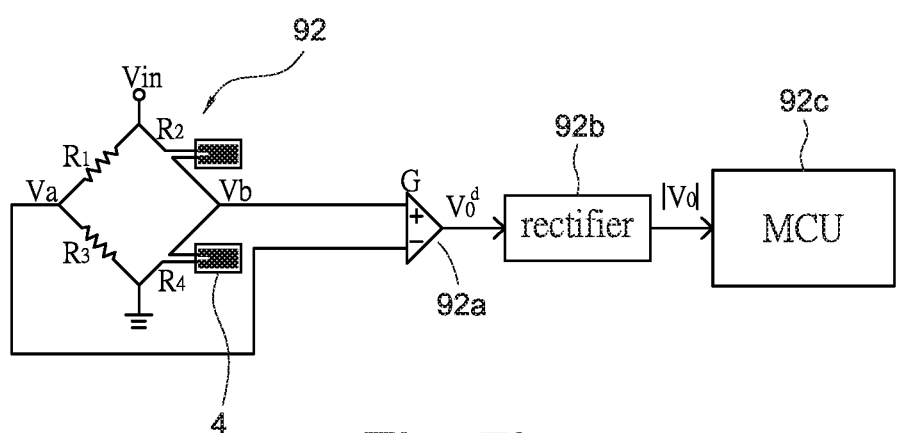

And then, referring FIGS. 7a and 7b, the FIG. 7a reveals that no matter the quantity of the positioning beam 3 is single or plural, only one piece of strain gauge 4 will be fixed to one of the positioning beams 3. For example, in the embodiment of FIGS. 1 to 4 showing the first positioning beam 3a and the second positioning beam 3b, only one of the positioning beams 3 is fixed with a strain gauge 4, and the electric bridge 91 is used to connect the connecting terminal 41/42 of the strain gauge 4, thereby detecting the variation of the strain gauge 4 when the strain gauge is influenced by the aforementioned strain c formed on the positioning beam 3. Wherein, the equation of the electric bridge 91 is as follows:

$$V_{ab} = V_b - V_a = \left(\frac{R_4}{R_2 + R_4} - \frac{R_3}{R_1 + R_3}\right) \cdot V_{in} \qquad \text{equation (3)}$$

Wherein $V_{in}$ is the input voltage of the power supply terminal, $V_{ab}$ is the voltage differences between the voltage $V_a$ and the voltage $V_b$, $R_4$ is the resistance of the strain gauge 4, R1=R2=R3=R are the resistance of different resistors. The specification of the strain gauge 4 will change when the strain gauge 4 is applied with the normal compressing force $F_{compress}$ or normal tensile force $F_{tensile}$ on the cross section of the positioning beam, the aforementioned changing includes the resistance of the strain gauge 4 will decrease when being compressed, and will increase when being pulled. Integrating the aforementioned information $R_4$=R+ΔR into the equation (3) can obtain the equation (4) as follows:

$$V_{ab} = \left(\frac{R+\Delta R}{2R+\Delta R} - \frac{R}{2R}\right) \cdot V_{in} = \qquad \text{equation (4)}$$
$$\left(\frac{2R+2\Delta R - 2R - \Delta R}{4R+2\Delta R}\right) \cdot V_{in} = \frac{\Delta R}{4R+2\Delta R} \cdot V_{in}$$

Wherein the ΔR is the variation of the resistance. Since the variation of the ΔR is very small, the $V_{ab}$ is very small as well, and an instrumentation amplifier 91a is needed to amplify the value of $V_{ab}$; the gain of the instrumentation amplifier 91a is G, and the output voltage $V_o^s$ is calculated according to the equation (5) bellow:

$$V_o^s = \left(\frac{\Delta R}{4R + 2\Delta R}\right) \cdot G \cdot V_{in} \qquad \text{equation (5)}$$

The aforementioned output voltage $V_o^s$ after being rectified by the rectifier 91b is outputted to a microcontroller unit (MCU) 91C, so as to be used as the strain deformation generated by the positioning beam 3 after being applied with the axial force according to the variation of the output voltage, and the precise torsion detecting value between the force input shaft 5 and the force output shaft 6 is then transformed and calculated.

FIG. 7b reveals the embodiment as shown in FIGS. 1 to 4, an electric bridge of the two strain gauges 4 are respectively fixed to the two positioning beams (first positioning beam 3a and second positioning beam 3b), and $R_1=R_3=R$; When the two strain gauges 4 are applied with the aforementioned normal compressing force $F_{compress}$ or normal tensile force $F_{tensile}$ on the cross section of the positioning beam, the resistance value $R_2$ and $R_4$ of the two strain gauges 4 will be changed; the variation of the resistance value $R_2$ and $R_4$ of the two strain gauges 4 are $-\Delta R$ and $\Delta R$; setting the resistance value as $R_2=R-\Delta R$ and $R_4=R+\Delta R$, and those equations are integrated into the equation (3) to obtain the equation (6) as follows:

$$V_{ab} = \left(\frac{R+\Delta R}{R-\Delta R+R+\Delta R} - \frac{R}{2R}\right) \cdot V_{in} = \qquad \text{equation (6)}$$

$$\left(\frac{R+\Delta R}{2R} - \frac{R}{2R}\right) \cdot V_{in} = \frac{\Delta R}{2R} \cdot V_{in}$$

Magnifying $V_{ab}$ by the instrumentation amplifier 92a G times, the data can be calculated by the equation (7) as shown below to obtain the output voltage $V_o^d$:

$$V_o^d = \frac{\Delta R}{2R} \cdot G \cdot V_{in} \qquad \text{equation (7)}$$

Wherein the function of the instrumentation amplifier 92a, the rectifier 92b, and the microcontroller unit (MCU) 92c are the same.

Comparing the equations (5) and (7), using two strain gauges can obtain larger output voltage variation $V_o^d$ compared to using one strain gauge, which is $V_o^s<V_o^d$; the voltage variation of using two strain gauges is two times of using one strain gauge. And because the value of the denominator is fixed, the linearity of using two strain gauges is better than using one strain gauge.

Another preferred embodiment of the present invention will illustrate a torque sensing device equipped with 1 to 4 pieces of strain gauges.

Referring to FIGS. 8 to 11, a second preferred embodiment of the torque sensing device according to the present invention is provided. The second preferred embodiment improves the planetary speed reducing mechanism to become a torque sensing device having speed reducing and increasing functions.

Figure 9:
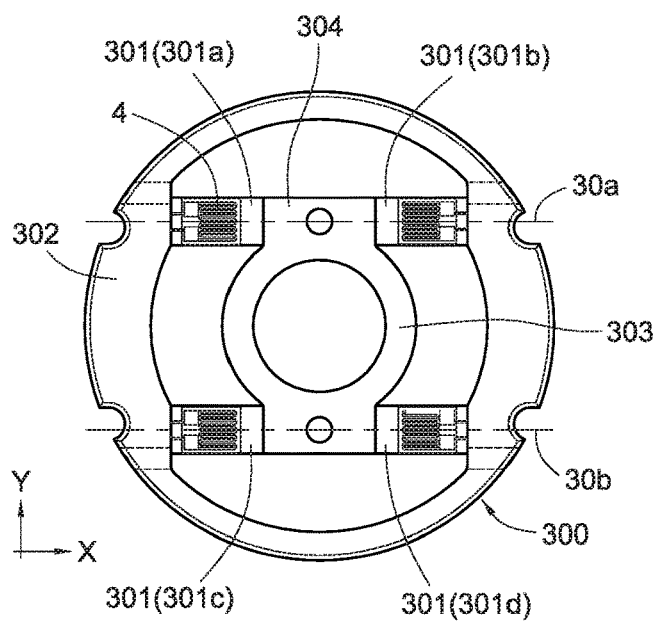
FIG. 9 is a vertical view of the positioning beam of claim 8.

Referring to FIG. 9, the torque sensing device includes four pieces of positioning beams 301 which are integrally formed on a wheel base 300 used as a basis. The periphery of the wheel base 300 is formed with a round-shaped base ring 302, and a hub 303 is formed at the center of the wheel base 300. The four positioning beams 301 respectively extend and connect between the round-shaped base ring 302 and the center of hub 303. The four pieces positioning beams 301 include a first positioning beam 301a, a second positioning beam 301b, a third positioning beam 301c, and a fourth positioning beam 301d. Wherein the first positioning beam 301a and the second positioning beam 301b are penetrated and evenly divided by a same beam central line 30a, the third positioning beam 301c and the fourth positioning beam 301d are penetrated and evenly divided by another beam central line 30b. The central beam lines 30a and 30b are parallelly spaced apart and symmetrically distributed relative to the wheel base 300. According to the first preferred embodiment, two strain gauges 4 are fixed to the first positioning beam 301a and the second positioning beam 301b respectively, and the third positioning beam 301c and the fourth positioning beam 301d are respectively fixed with a strain gauge 4 as well.

FIG. 9 further discloses that the middle section of both sides of the central hub 303 respectively extend to form an ear part 304. The first positioning beam 301a and the second positioning beam 301b, the third positioning beam 301c and the fourth positioning beam 301d, are respectively connected together as single unit by the ear part 304. In other words, the ear part 304 can be deemed as an end of each positioning beam.

Figure 8:
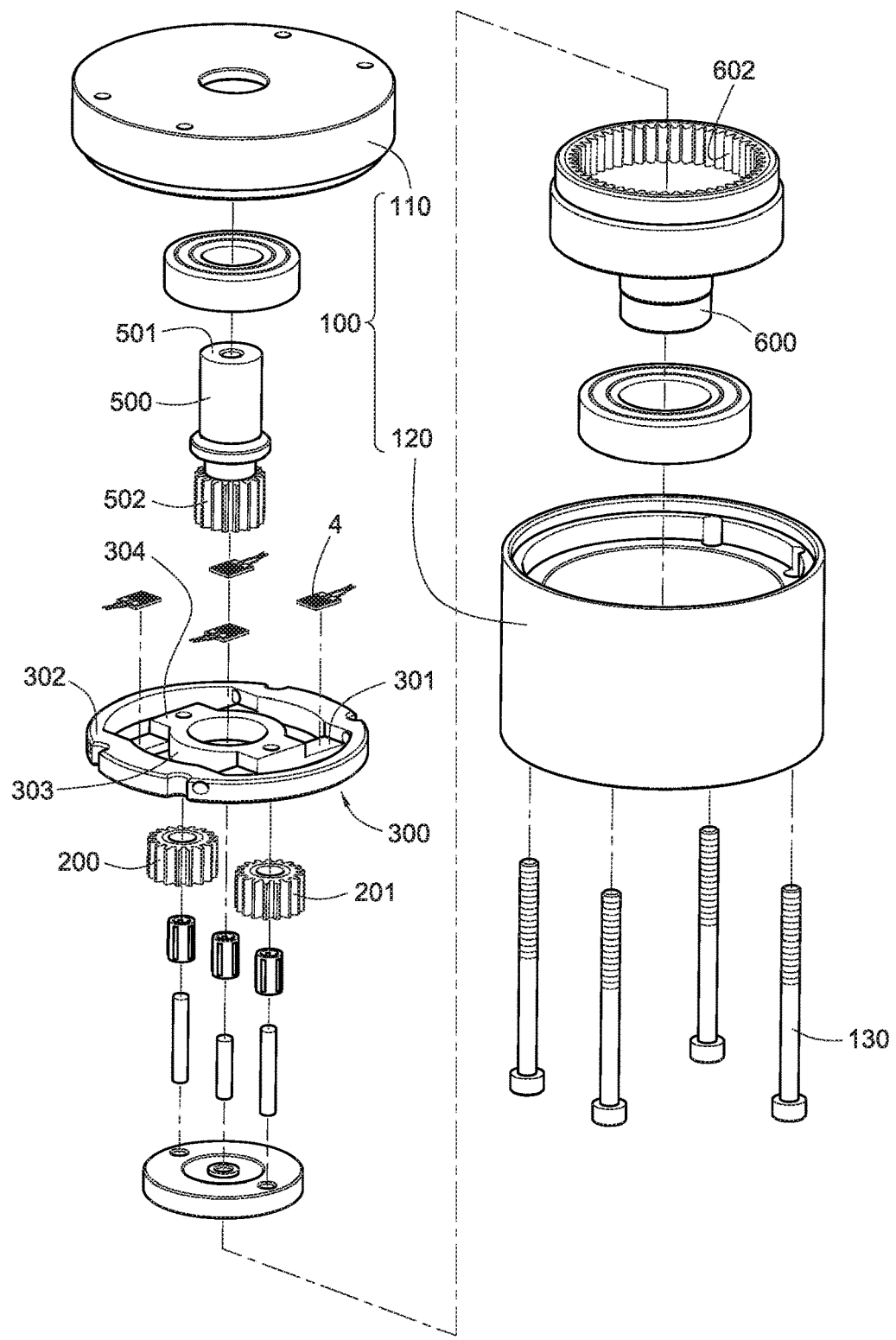
FIG. 8 is an exploded perspective view of a second preferred embodiment of the torque sensing device according to the present invention.

Referring to FIG. 8, a casing 100 assembled by screwing an upper casing 110 and a lower casing 120 together via screw 130 is used to accommodate and fix the wheel base 300, and two ear parts 304 are respectively and pivotally disposed with an idle wheel 200/201. Wherein the idle wheel 200/201 in the present embodiment can be deemed as a planetary gear (shown in 200/201 hereinafter) having the same function as the idle gear. The center of the planetary gear 200 is disposed between the first positioning beam 301a and the second positioning beam 301b. The first positioning beam 301a, the center of the planetary gear 200, and the second positioning beam 301b are sequentially penetrated by a same beam central line 30a; The center of the planetary gear 201 is disposed between the third positioning beam 301c and the fourth positioning beam 301d. The third positioning beam 301c, the center of the planetary gear 20a, and the fourth positioning beam 301d are sequentially penetrated by a same beam central line 30b. The centers of the planetary gear 200/201 are respectively disposed between the center of the strain gauges 4 which are aligned in a same beam central line, and are spaced apart by the beam central line 30a and 30b respectively.

Figure 10:
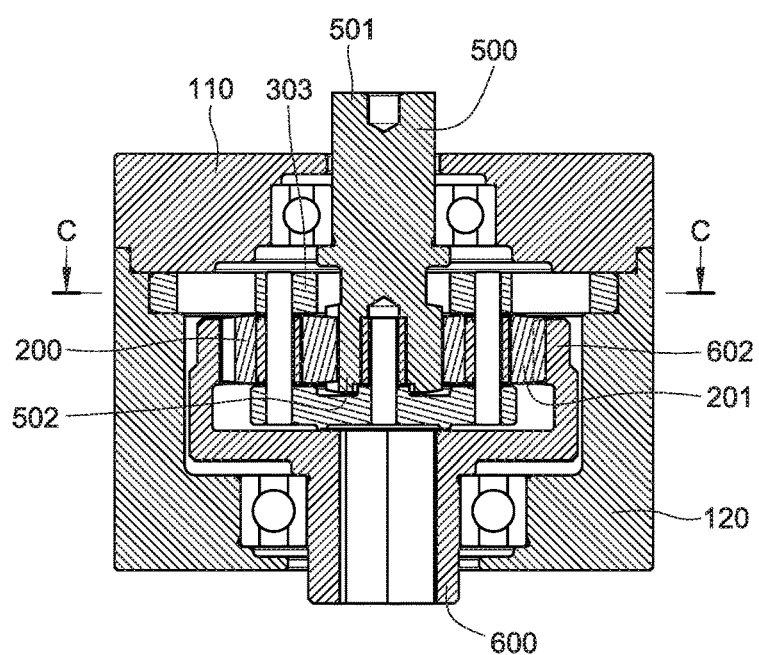
FIG. 10 is a sectional view of FIG. 8.

Referring to FIGS. 8 and 10, a force input shaft 500 is pivotally disposed at the center of the upper casing 110 and through set at the hub 303 to allow one terminal 501 of the force input shaft 500 protrudes outside of the casing 100. Another terminal of the force input shaft 500 extends into the casing 100 and pivotally connects to a sun gear 502. Therefore, the sun gear 502 is set through the center of the hub 303, and engages to the planetary gear 200/201.

Figure 11:
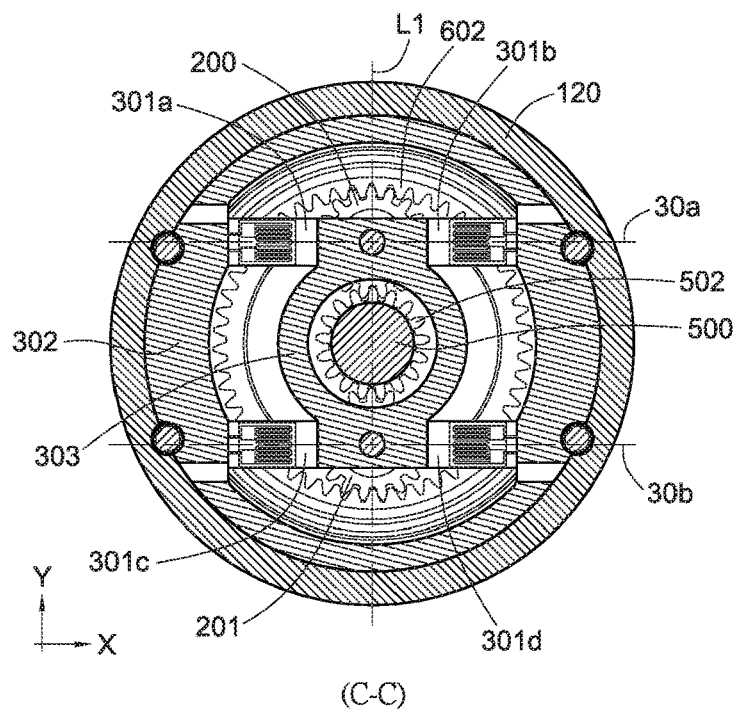
FIG. 11 is a C-C sectional view of FIG. 10.

Referring to FIGS. 10 and 11, the force input shaft 500 is coaxially disposed and spaced apart from the force output shaft 600. The force output shaft 600 is consisted of an annular gear 602 surrounding the periphery of the sun gear 502. In other words, the force output shaft 600 and the annular gear 602 are coaxially and integrally formed. The force output shaft 600 and the annular gear 602 are pivotally disposed at the center of the lower casing 120 to allow the annular gear 602 to be accommodated inside the casing 100 to engage to the planetary gear 200/201.

Referring to FIG. 11, the planetary gear 200/201 are restricted by the four positioning beams 301 to not rotate around the sun gear 502, so the planetary gear 200/201 can engage between the sun gear 502 which inputs force and the annular gear 602 which outputs force to bear the loading of the tangential force. More specifically, the center of the force input shaft 500, the sun gear 502, the planetary gear 200/201 used as the idle wheel, the force output shaft 600 and the annular gear 602 are all disposed on the straight line L1. The straight line L1 is parallel to the Y axis in the FIG. 11. The line L1 respectively forms a right angle with the bean central line 30a and 30b. The sun gear 502 inputting force, the planetary gear 200/201 used as idle wheel, and the annular gear 602 outputting force are all disposed on line L1 and engage with one another.

Therefore, the force input shaft 500 and the force output shaft 600 respectively connect the planetary gear 200/201 used as idle wheel through the sun gear 502 and the annular gear 602. When the sun gear 502 rotates clockwise, the two planetary gears 200/201 will be driven to rotate counter-clockwise to output power. The annular gear 602 overcomes the torsion loading T1', and the sun gear 502 inputs torsion T2'. The torsion obtained by multiplying the reduction ratio and the T2' should overcome the T1' to reach a balance. A tangential force F1' is formed between the contacting point of the sun gear 502 and the planetary gears 200/201; Another tangential force F2' is formed between the contacting point of the annular gear 602 and the planetary gears 200/201; the tangential forces F1' and F2' are parallel to each other along the X axis direction, and the direction of the beam central lines 30a and 30b of the four positioning beams 301 are parallel to the direction of the tangential forces F1' and F2'.

Figure 12A:
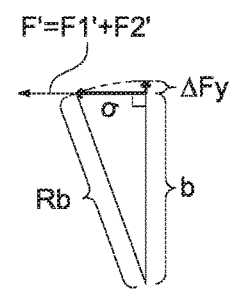
FIG. 12a is an illustration that the positioning beam generates X-Y axial strain when receives force as shown in FIG. 12.
Figure 12:
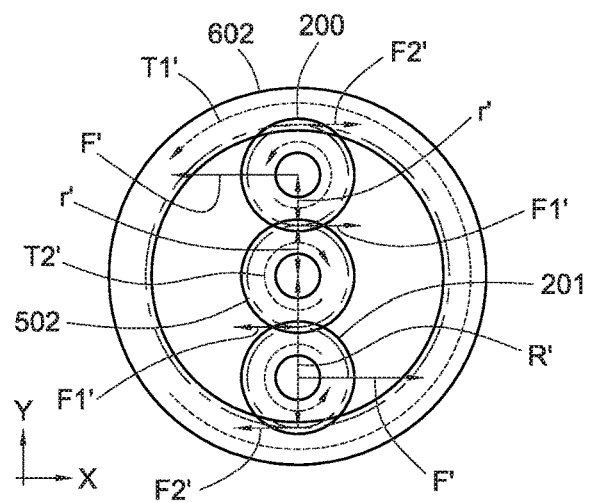
FIG. 12 is an illustration of the axial force applied to the positioning beam of FIG. 11 according to the present invention.

Referring to FIG. 12, according to the known force balance theorem $\Sigma Fx=0$, it can be known that $F'=F1'+F2'$, similarly, the four positioning beams 301 in the fixed end restrict the planetary gears 200/201 to be only able to do in situ rotation, and the F' in the equation above becomes the counterforce generated by the center of the planetary gears 200/201 along the beam central lines 30a/30b. The counterforce F' (axial force F hereinafter) is applied to the cross section of the four positioning beams 301 in a way of normal force, in other words, the four positioning beams 301 form strain respectively under the axial force F'.

Figure 13:
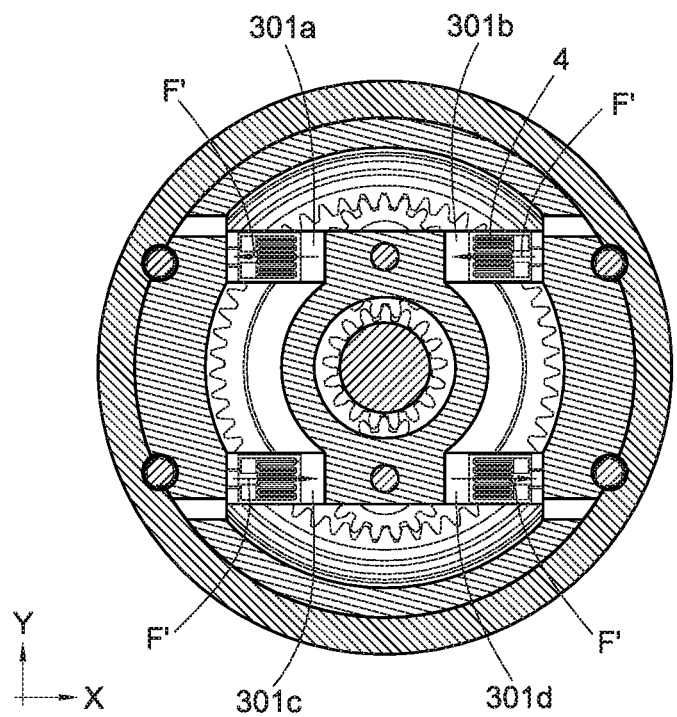
FIG. 13 is a schematic view showing the strain gauge receiving the axial force as shown in FIG. 9.

Furthermore, as shown in FIG. 13, for the first positioning beam 301a and the second positioning beam 301b on the beam central line 30a, the axial force F' provides X axis direction's normal compressing force $F_{compress}$ to apply on the cross section of the first positioning beam 301a and the strain gauge 4 fixed thereon to form compressing strain. The axial force F' also acts as normal tensile force $F_{tensile}$ to apply to the cross section of the second positioning beam 301b and the strain gauge 4 fixed thereon to form tensile strain. Similarly, the axial force F' provides X axis direction's normal compressing force $F_{compress}$ to apply on the cross section of the third positioning beam 301c and the strain gauge 4 fixed thereon to form compressing strain, the axial force F' provides X axis direction's normal tensile force $F_{tensile}$ to apply on the cross section of the fourth positioning beam 301d and the strain gauge 4 fixed thereon to form tensile strain In addition, the preferred embodiment of the present invention further simulates the structural safety by the following data when the four positioning beams 301 form strain deformation, which includes: setting the torsion T1'=16 N-m received by the annular gear 602. According to the force balance, it can be known that the driving torsion T2'=T1'/GR(gear ratio); the pitch radius of the annular gear 602 is R'=15.3 mm; the pitch radius of the sun gear 502 and the planetary gear 200/201 is r'=5.1 mm. Based on equations (1) and (2) above, it can be calculated as follows:

$$F1'=F2'=(T1'/R')/2=106.6/2Kg=53.3Kgf, \text{ and}$$

$$F'=F1'+F2'=106.6 \text{ Kgf}$$

The present embodiment selects the same metal material (A6061-T6) as the first embodiment to make four positioning beams 301 with the same specification (integrally formed from the wheel base 300), and structure of the four positioning beams 301 formed on the wheel base 300 is safe; the base ring 302 and the hub 303 integrally formed on the wheel base 300 are safe as well.

Besides, referring to FIG. 12a, in the engaging and driving process of the sun gear 502 inputting force, the planetary gear 200/201 used as idle wheel, and the annular gear 602 outputting force, analyzing if the positioning beam 3 would receive a subtle displacement $\Delta y$ in Y axle direction due to the restraint of annular gear revoluting around the sun gear 520. When in analyzing, according to the pitch radius r'=5.1 mm of the sun gear 502, and the pitch radius r'=5.1 mm of the planetary gear 200, it can be known that $R_b$=10.2 mm, and the elongation (or shortening) of the positioning beam $\delta$=0.024 mm. Based on those data and the Pythagorean Theorem $(a^2+b^2=c^2)$, the equation (8) below can be obtained:

$$\sigma^2+b^2=R_b^2 \quad \text{equation (8)}$$

After calculation, b=10.19997, and it can be known from the FIG. 12a that $R_b=b+\Delta Fy$, which means $\Delta Fy=R_b-b=0.000028$. Therefore, the b value is almost the same as $R_b$, which shows that the deformation of the $\Delta Fy$ along the y axis is extremely small, and thus can be omitted.

Figure 14:
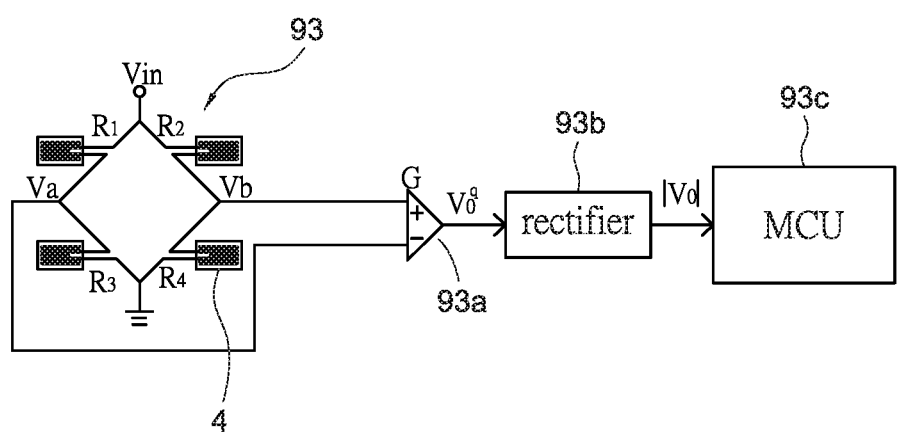
FIG. 14 is a schematic diagram showing the circuit configuration of the 4 pieces strain gauge as disclosed in FIG. 9.

Referring to FIG. 14, which shows the electric bridge circuit needed when the four positioning beams 301a, 301b, 301c, 301d are respectively fixed with a strain gauge 4. When the strain gauge 4 is pulled or compressed, the resistance value $R_1$, $R_2$, $R_3$, and $R_4$ will change. The variation of the resistance value of the $R_2$ and $R_3$ when under force is $-\Delta R$, and the resistance value of the $R_1$ and $R_4$ when under force is $\Delta R$. Setting the resistance value $R_2=R_3=R-\Delta R$, $R_1=R_4=R+\Delta R$, and those equations are integrated into the equation (3) to obtain the equation (9) as follows:

$$V_{ab} = \left(\frac{R+\Delta R}{R-\Delta R+R+\Delta R} - \frac{R-\Delta R}{R-\Delta R+R+\Delta R}\right) \cdot V_{in} = \left(\frac{R+\Delta R}{2R} - \frac{R-\Delta R}{2R}\right) \cdot V_{in} = \frac{\Delta R}{R} \cdot V_{in} \quad \text{equation (9)}$$

Magnifying Vab by the instrumentation amplifier 93a G times, the data can be calculated by the equation (10) as shown below to obtain the output voltage $V_o^q$:

$$V_o^q = \frac{\Delta R}{R} \cdot G \cdot V_{in} \quad \text{equation (10)}$$

Wherein the function of the instrumentation amplifier 93a, the rectifier 93b, and the microcontroller unit (MCU) 93c are the same as the previous embodiment.

Comparing the equations (7) and (10), using four strain gauges can obtain larger output voltage variation $V_o^q$ compared to using two strain gauges, which is $V_0^d < V_0^q$; the voltage difference of using four strain gauges is two times of using two strain gauges, and about four times of using one strain gauge. Therefore, in the present invention, the more strain gauges are installed, the more precise torsion detecting data can be obtained. However, the quantity of the strain gauge is not limited to four, in other words, the embodiment based on equations (5) and (7) can be also applied to the present embodiment having four positioning beams 301.

Besides, it is noted that, in the torque sensing device as shown in FIGS. 8 to 11, the center of the planetary gear 200/201 can also not to be pivotally installed on the beam central lines 30*a* and 30*b* of the four positioning beams 301, as long as the positioning beams are parallel to one another (colinear or non-colinear) and symmetrically disposed, and the planetary gears 200/201 are symmetrically disposed as well. Based on those mentioned above, one skilled in the art can obtain the same result according to the force theorem.

Figure 15:
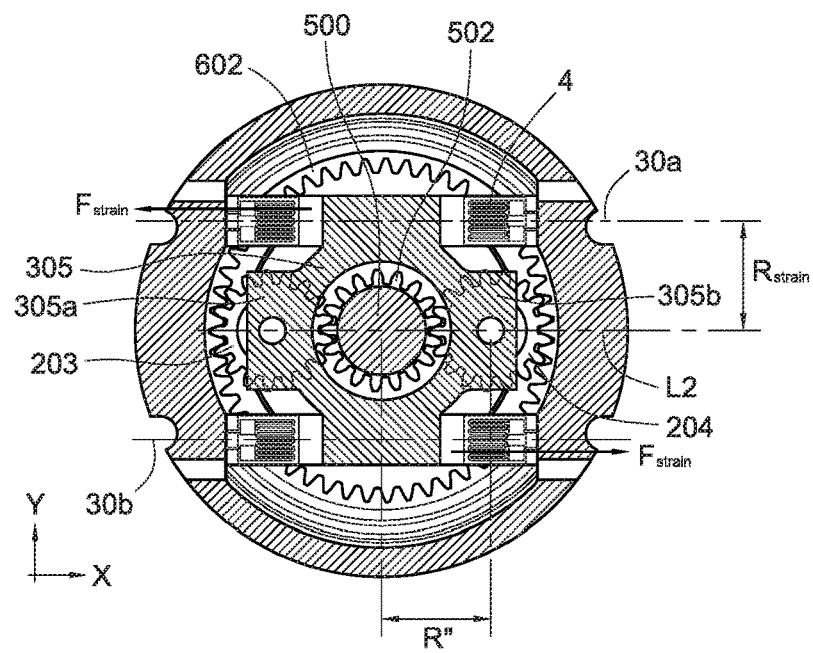
FIG. 15 is a sectional view of a third preferred embodiment of the torque sensing device according to the present invention.

Referring to FIG. 15, which shows the third embodiment of the torque sensing device according to the present invention. The differences compared to the second embodiment lie in that: the center of the idle wheels 203/204 is not pivotally disposed on the positioning beam 301. Instead, the center of the idle wheels is pivotally installed on the wheel base 305 which can be integrally formed with positioning beam 301 and used as a basis. By this arrangement, the planetary gears 203/204 used as idle wheel is changed to be restricted by the wheel base 305 instead of the positioning beam 301, and the planetary gears 203/204 do not rotate around the sun gear 502. More specifically, the wheel base 305 is formed with symmetric ear parts 305*a*/305*b* which are adjacent to both ends of the force input shaft 500, the idle wheels 203/204 are symmetrically and pivotally disposed on the ear parts 305*a*/305*b* respectively and adjacent to the periphery of the positioning beam 301. Other parts of the structure are the same as second embodiment.

In the embodiment shown in FIG. 15, the idle wheels 203/204 are horizontally and symmetrically to be pivotally installed aside the force input shaft 500. In other words, the center of the idle wheels 203/204 and the force input shaft 500 are all disposed on the wheel central line L2 at the same level, which makes the wheel central line L2 parallel to the beam central lines 30*a* and 30*b*.

Figure 16:
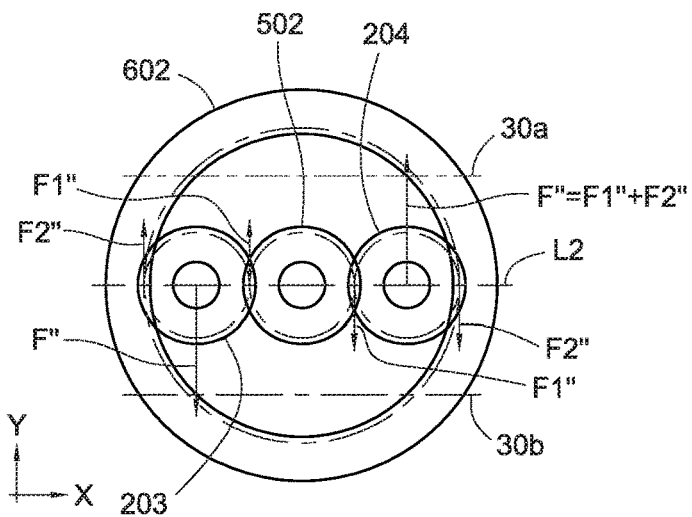
FIG. 16 is an illustration that the positioning beam generates X-Y axial strain when receives force as shown in FIG. 15.

Referring to FIGS. 15 and 16, when the wheel central line L2 is parallel to the beam central lines 30*a*/30*b*, based on the force balance theorem $\Sigma F_y = 0$ and $\Sigma M_0 = 0$, it can be known that: F'''=F1''+F2'', and F'''×R''=$F_{strain}$×$R_{strain}$.

Wherein the F1'' is the Y direction tangential force formed at the contact point of the sun gear 502 inputting force and the planetary gears 203/204 used as idle wheel; the F2'' is the Y direction tangential force formed at the contact point of the annular gear 602 outputting force and the planetary gear 203/204; the F''' is the counterforce formed by the planetary gears 203/204 along the Y direction, R'' is the distance between the center of the sun gear 502 and the center of the planetary gear 203; $F_{strain}$ is the axial force applied to the four positioning beams 301; $R_{strain}$ is the distance between the wheel central line L2 and the beam central line. According to those mentioned above, the axial force $F_{strain}$ which the positioning beams 301 bear can be obtained, thereby knowing the strain deformation generated by the positioning beams 301.

Besides, since the torsion transferring and transforming between the sun gear 502 inputting force and the annular gear 602 outputting force will not change by the changing of the arrangement angle of the planetary gears 203/204 used as idle wheel relative to the positioning beam 301, the wheel central line L2 can be also set as non-parallel to the beam central lines 30*a*/30*b*. In other words, the wheel central line L2 can form a non-zero degree angle θ (not shown in the FIG.) with the beam central lines 30*a*/30*b*. According to the force balance theorem, it can be known that 2F'''×R'' cos θ=2$F_{strain}$×$R_{strain}$ cos θ, and the axial force $F_{strain}$ can be obtained to further calculate the strain deformation. Those mentioned above are all in the field of the present invention.

Further, the torque sensing device of the present invention can be installed on a rotational driving tool to detect the torsion during the driving process.

Figure 17:
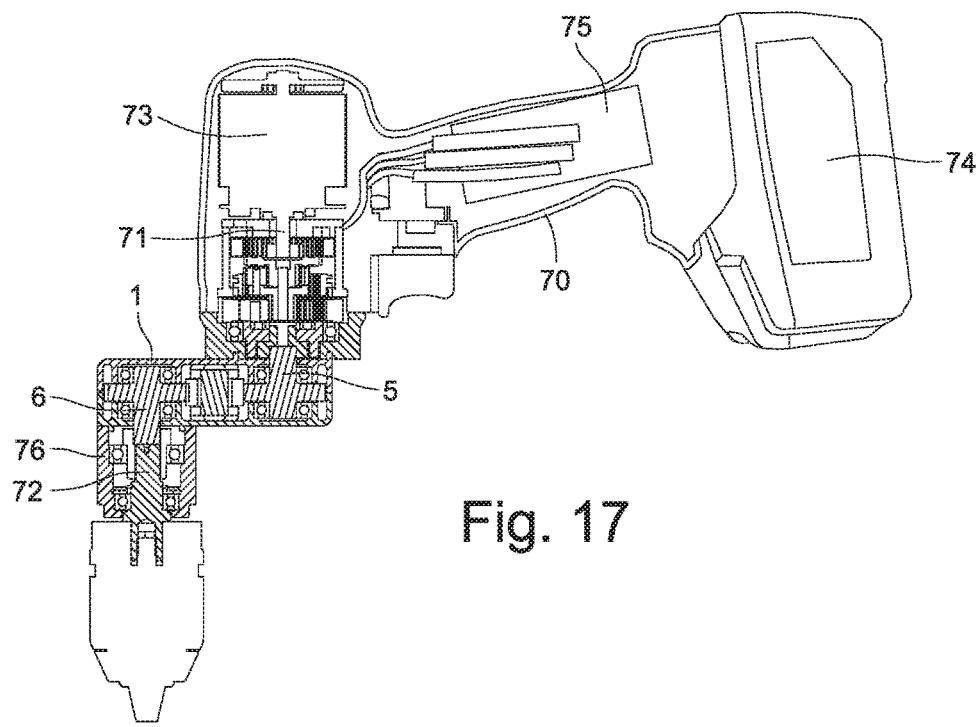
FIG. 17 is a sectional view of the rotational driving tool made according to the first preferred embodiment shown in FIG. 1.

Referring to FIG. 17, which shows the first embodiment of a rotational driving tool installed with the torque sensing device as embodied in FIG. 1. Specifically, the rotational driving tool is substantially a conventional electric or pneumatic screw driver, which includes a driving shaft 71 and a working shaft 72; the driving shaft 71 is pivotally connected to a driving motor 73 to provide driving torque, the working shaft 72 is used to output the torque to drive the outer working piece to rotate.

In the embodiment shown in FIG. 17, the rotational driving tool is an electric screw driver (or screw nail gun), which includes a gun body 70, a battery 74 installed inside the accommodation space of the gun body 70, a circuit board 75, a driving motor 73, and a driving shaft 71. Wherein, the battery 74 can be recharged by connecting to an outer power outlet. The battery 74 is electrically connected to the circuit board 75. The circuit board 75 is electrically connected to the driving motor 73, so that the battery 74 can provide electricity to drive the driving motor 73, and further brings the driving shaft 71 to rotate. In the present embodiment, the driving motor is an electric motor, and one end of the driving shaft 71 protrudes outside of the gun body 70.

In the embodiment shown in FIG. 17, the casing 1 of the torque sensing device as shown in FIG. 1 is directly and modularly assembled to the gun body 70 to protrude an end having the driving shaft 71. The modularly assemble includes embedding, clipping, locking, and any mechanical means to connect the casing 1 to the gun body 70, so as to enable the driving shaft 71 to coaxially connect the force input shaft 5 to drive the force input shaft 5 to rotate.

FIG. 17 further discloses that the end protruded with a force output shaft 6 of the casing 1 is modularly assembled with a shaft base 76, the working shaft 72 is pivotally connected inside the shaft base 76 to allow the working shaft 72 to coaxially connect to the force output shaft 6 to drive the working shaft 72 to rotate, so as to output the torque to drive the outer working piece to rotate. Wherein, the driving shaft 71 and the working shaft 72 are non-coaxial disposed. The torque sensing device is used to detect the torsion between the driving shaft 71 and the working shaft 72 in order to know and control the torque value needed for driving the outer working piece.

Figure 18:
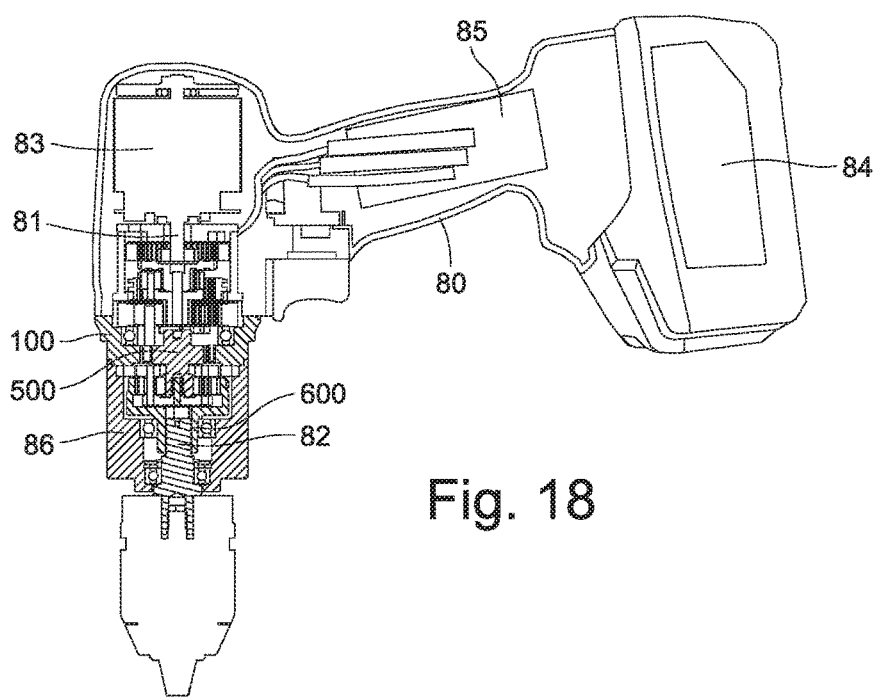
FIG. 18 is a sectional view of the rotational driving tool made according to the second or third preferred embodiment shown in FIG. 8 or 15.

Referring to FIG. 18, which shows the rotational driving tool combined with the torque sensing devices embodied in FIG. 8 and FIG. 15. Specifically, the rotational driving tool is substantially the conventional electric or pneumatic screw driver, which includes a driving shaft 81 and a working shaft 82; the driving shaft 81 connects a driving motor 83 to provide driving torque, and the working shaft 82 is used to output the torque to drive the outer working piece to rotate.

In the embodiment of FIG. 18, the rotational driving tool is an electric screw driver (or screw nail gun), which includes a gun body 80, a battery 84 installed inside the accommodation space of the gun body 80, a circuit board 85, a driving motor 83, and a driving shaft 81. Wherein, the battery 84 can be recharged by connecting to an outer power outlet. The battery 84 is electrically connected to the circuit board 85. The circuit board 85 is electrically connected to the driving motor 83, and further connects to the driving shaft 81 by a wire, so that the battery 84 can provide electricity to drive the driving motor 83, and further brings the driving shaft 81 to rotate. In the present embodiment, the driving motor must be electric motor, and one end of the driving shaft 81 protrudes outside of the gun body 80.

In the embodiment of FIG. 18, the casing 100 of the second embodiment of the torque sensing device shown in FIG. 8 is directly and modularly assembled to the gun body 80 to protrude an end having the driving shaft 81, so as to enable the driving shaft 81 to coaxially connect the force input shaft 500 to drive the force input shaft 500 to rotate.

FIG. 18 further discloses that the end protruded with a force output shaft 600 of the casing 100 is modularly assembled with a shaft base 86, the working shaft 82 is pivotally connected inside the shaft base 86 to allow the working shaft 82 to coaxially connect to the force output shaft 600 to drive the working shaft 82 to rotate, so as to output the torque to drive the outer working piece to rotate. Wherein, the driving shaft 81 and the working shaft 82 are coaxial disposed. The torque sensing device is used to detect the torsion between the driving shaft 81 and the working shaft 82 in order to know and control the torque value needed for driving the outer working piece.

Except the two electric screw drivers shown in FIGS. 17 and 18, the rotational driving tool according to the present invention can further include pneumatic screw driver, and other electric or pneumatic type rotational driving tool. The tool can be hand held type or fixed machine type. Wherein, when the rotational driving tool is pneumatic type which is powered by high pressure air, the driving motor should be pneumatic motor.

Figure 19:
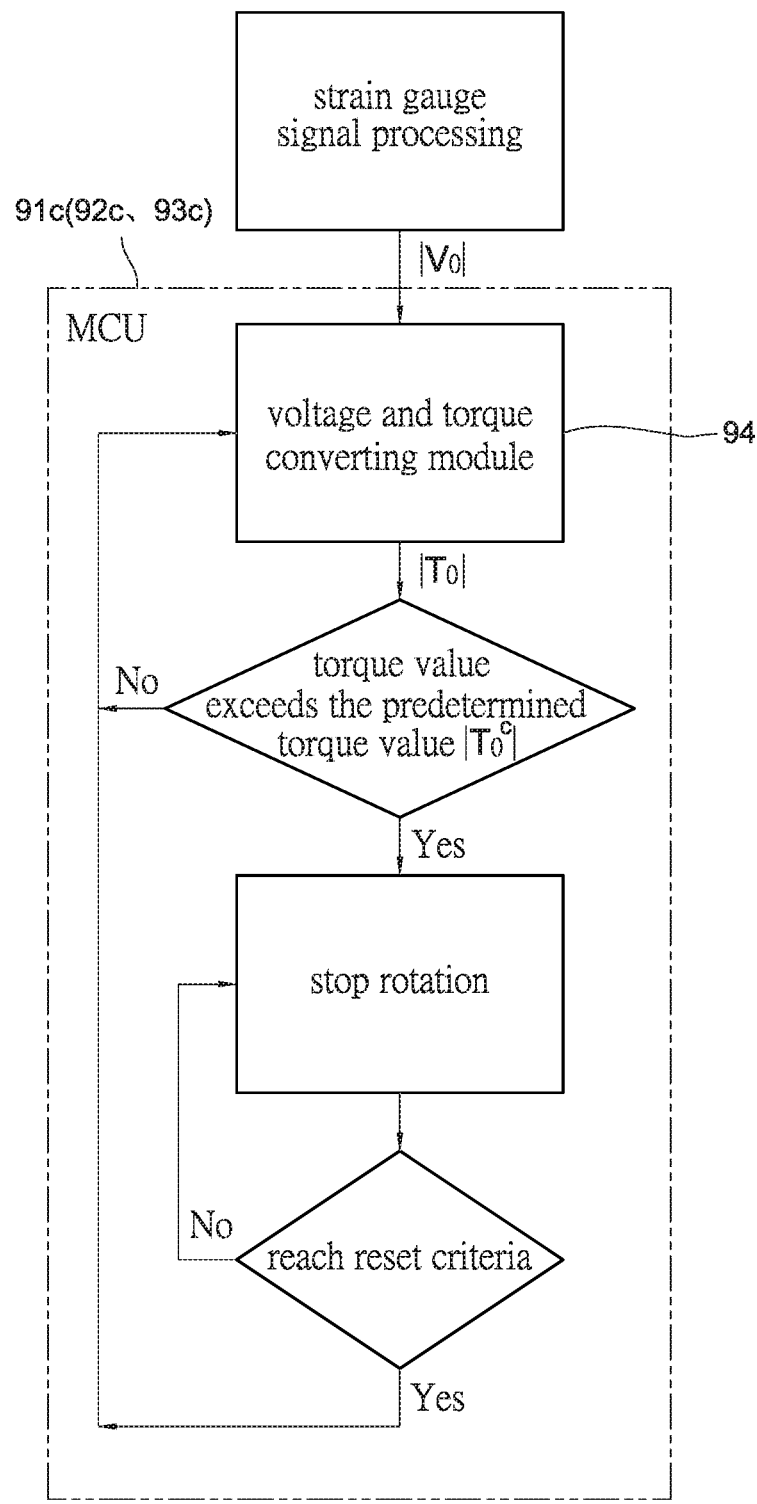
FIG. 19 is a controlling flowchart of the embodiment shown in FIGS. 17 and 18.

FIG. 19 shows a controlling flow chart, the embodiments shown in FIGS. 17 and 18 can use the function of rectifying and outputting voltage $V_O^s$, $V_O^d$ and $V_O$ by the rectifier 91*b*, 92*b*, 93*b* as shown in FIGS. 7*a*, 7*b*, and 14 to obtain a voltage value representing the present outputted working torque from the rotational driving tool, and the voltage value is transferred to a microcontroller unit (MCU) 91*c*, 92*c*, 93*c* to calculate and obtain the torque value outputted from the rotational driving tool. Wherein, the MCU 91*c*, 92*c*, 93*c* have a voltage and torque converting module 94. The voltage value will be transferred to the voltage and torque converting module 94 to convert the voltage value into a torque value. The MCU or the voltage and torque converting module 94 is built-in or installed outside with a predetermined torque value.

When the torque value $T_O$ is smaller than the predetermined torque value $T_O$, the rotational driving tool can keep rotating. When the torque value $T_O$ is larger than the predetermined torque value $T_O^c$, the rotational driving tool will be ordered to stop rotating, and the tool will be determined if meeting the reset criteria. If yes, the voltage and torque converting module 94 will be back to work and keep converting the voltage value into a torque value, so as to circulate the torque controlling motion; if no, the rotating procedure will be stopped, and the torque value will be examined again to see if meeting the reset criteria.

According to the first to third embodiments, it is easy to understand the present invention puts the idle gear or planetary gear used as idle wheel between the force input end and force output end to stand the loading, and thus the loading can be swiftly transferred to the positioning beam used to fix the strain gauge. By doing so, the unwanted bending torque loading on the positioning beam can be prevented, and the positioning beam can form even strain deformation within a specific length range, so as to make the strain gauge form even deformation to improve the torque detecting precision of the strain gauge in the torque sensing device.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A torque sensing device, comprising:
    an idle wheel disposed between an force input shaft and an force output shaft, the idle wheel receiving a tangential force formed by the force input shaft and the force output shaft respectively, and a sum of the tangential forces being formed a counteraction force as a loading of the idle wheel;
    a linear shaped positioning beam having a beam central line extending along the positioning beam, a center of the idle wheel being pivotally disposed on the positioning beam where the beam central line penetrates through;
    a strain gauge fixed to the positioning beam where the beam central line penetrates through, the center of the idle wheel being separated from a center of the strain gauge by the beam central line;
    wherein the positioning beam transforms the loading of the idle wheel to an axial force along the beam central line, the positioning beam generates a strain by the axial force, the strain gauge detects the strain as a torque sensing value of the force output shaft on the region between the force input shaft and the force output shaft.

2. The torque sensing device according to claim 1, wherein the idle wheel, the force input shaft, and the force output shaft are non-coaxial disposed.

3. The torque sensing device according to claim 2, wherein directions of the tangential forces are the same, and directions of the tangential forces and the counteraction force are opposite; the counteraction force is the axial force.

4. The torque sensing device according to claim 3, wherein a direction of the beam central line of the positioning beam is parallel to the directions of the tangential forces, and a center of the force input shaft, a center of the force output shaft, and the center of the idle wheel are all aligned to be perpendicular to the beam central line.

5. The torque sensing device according to claim 3, wherein a force input gear coaxially fixed to the force input shaft, and a force output gear coaxially fixed to the force output shaft; the idle wheel is an idle gear; the idle gear engages to the force input gear and the force output gear to bear the loading.

6. The torque sensing device according to claim 5, wherein the idle wheel separates the positioning beam into a first positioning beam and a second positioning beam which are respectively disposed on both sides of the idle wheel on the beam central line; the strain gauge is disposed on the beam central line of at least one of the first positioning beam and the second positioning beam, the axial force is stretchably applied to the strain gauge on the first positioning beam to cause a tensile strain; the axial force presses the strain gauge on the second positioning beam to cause compressing strain.

7. The torque sensing device according to claim 1 further comprising a casing used as a basis and accommodating the torque sensing device; the positioning beam and the casing being fixed as an integral unit.

8. A torque sensing device, comprising:
an idle wheel disposed between an force input shaft and an force output shaft, the idle wheel receiving a tangential force formed by the force input shaft and the force output shaft respectively, and a sum of the tangential forces being formed a counteraction force as a loading of the idle wheel;
a linear shaped positioning beam having a beam central line extending along the positioning beam, a center of the idle wheel being pivotally disposed on the positioning beam;
a strain gauge fixed to the positioning beam where the beam central line penetrates through, the center of the idle wheel being separated from a center of the strain gauge by the beam central line;
wherein the positioning beam transforms the loading of the idle wheel to an axial force along the beam central line, the positioning beam generates a strain by the axial force, the strain gauge detects the strain as a torque sensing value of the force output shaft on the region between the force input shaft and the force output shaft.

9. The torque sensing device according to claim 8, wherein the force input shaft and the force output shaft are coaxial disposed and spaced apart from each other.

10. The torque sensing device according to claim 9, wherein directions of the tangential forces are the same, and directions of the tangential forces and the counteraction force are opposite; the counteraction force is the axial force.

11. The torque sensing device according to claim 10, wherein the force input shaft coaxially fixed to a sun gear, the force input shaft is formed by an annular gear encircling the sun gear, a quantity of the idle wheel is at least two and the two idle wheels are planetary gears respectively and symmetrically disposed between the sun gear and the annular gear, the planetary gear engages between the sun gear receiving force and the annular gear outputting force to bear a torsion, the two planetary gears are restricted by the positioning beam and do not rotate around the sun gear.

12. The torque sensing device according to claim 11, wherein a coaxially connecting target of the force output shaft exchanges with a forming target of the force input shaft.

13. The torque sensing device according to claim 11, wherein an amount of the positioning beam is plural, and the positioning beams are spaced part by the planetary gears and symmetrically disposed on a wheel base used as a basis.

14. The torque sensing device according to claim 13, wherein the positioning beams are separated by the planetary gears to dispose on a co-beam central line at both sides of the planetary gears as a first positioning beam and a second positioning beam, the strain gauge is disposed on the beam central line of at least one of the positioning beams, the axial force is stretchably applied to the first positioning beam to cause a tensile strain, the axial force presses the second positioning beam to cause compressing strain, the strain gauge detects at least one of the tensile strain deformation and the compressing strain deformation to form strain.

15. The torque sensing device according to claim 14, wherein a hub is formed at a center of the wheel base, and the sun gear is disposed through a center of the hub.

16. The torque sensing device according to claim 14 further comprising a casing for accommodating the torque sensing device, the wheel base and the casing being fixed as a integral unit.

17. The torque sensing device according to claim 8, wherein a direction of the beam central line of the positioning beam is parallel to the directions of the tangential forces, and a center of the force input shaft, a center of the force output shaft, and the center of the idle wheel are all aligned to be perpendicular to the beam central line.

18. The torque sensing device according to claim 8, wherein the center of the idle wheel pivotally installed on the beam central line of the positioning beam.

19. A torque sensing device, comprising:
an idle wheel disposed between an force input shaft and an force output shaft, the idle wheel receiving a tangential force formed by the force input shaft and the force output shaft respectively, and a sum of the tangential forces being formed a counteraction force as a loading of the idle wheel;
a linear shaped positioning beam having a beam central line extending along the positioning beam, the positioning beam being formed on a wheel base used as a basis, a center of the idle wheel being pivotally disposed on the wheel base;
a strain gauge fixed to the positioning beam where the beam central line penetrates through;
wherein the loading of the idle wheel transfers to the positioning beam through the wheel base, and the loading is transformed to an axial force along the beam central line by the positioning beam, the positioning beam generates a strain by the axial force, the strain gauge detects the strain as a torque sensing value of the force output shaft on the region between the force input shaft and the force output shaft.

20. The torque sensing device according to claim 19, wherein the force input shaft and the force output shaft are coaxial disposed and spaced apart from each other.

21. The torque sensing device according to claim 20, wherein directions of the tangential forces are the same, and directions of the tangential forces and the counteraction force are opposite; directions of the counteraction force and the axial force are non-parallel to each other.

22. The torque sensing device according to claim 21, wherein the force input shaft coaxially fixed to a sun gear, the force output shaft is formed by an annular gear encircling the sun gear, a quantity of the idle wheel is at least two and the two idle wheels are planetary gears respectively and symmetrically disposed between the sun gear and the annular gear, the planetary gear engages between the sun gear receiving force and the annular gear outputting force to bear a torsion, the two planetary gears are restrained by the wheel base and do not rotate around the sun gear.

23. The torque sensing device according to claim 22, wherein a pivotally connecting object of the force input shaft exchanges with the force output shaft.

24. The torque sensing device according to claim 22, wherein the positioning beams are separated as a first positioning beam and a second positioning beam disposed on a co-beam central line, the strain gauge is disposed on the beam central line of at least one of the positioning beams, the axial force is the normal tensile force applied to the cross section of the first positioning beam to cause a tensile strain, and is the normal compressing force applied on the second positioning beam to cause compressing strain, the strain gauge detects at least one of the tensile strain deformation and the compressing strain deformation to form strain.

25. The torque sensing device according to claim 24, wherein a hub is formed at a center of the wheel base, and the sun gear is pivotally disposed at a center of the hub.

26. The torque sensing device according to claim 24 further comprising a casing for accommodating the torque sensing device, the wheel base and the casing being fixed as a integral unit.

\* \* \* \* \*